W. L. RICHARDS.
SIPHON PUMP.
APPLICATION FILED DEC. 18, 1908.
919,079.
Patented Apr. 20, 1909.
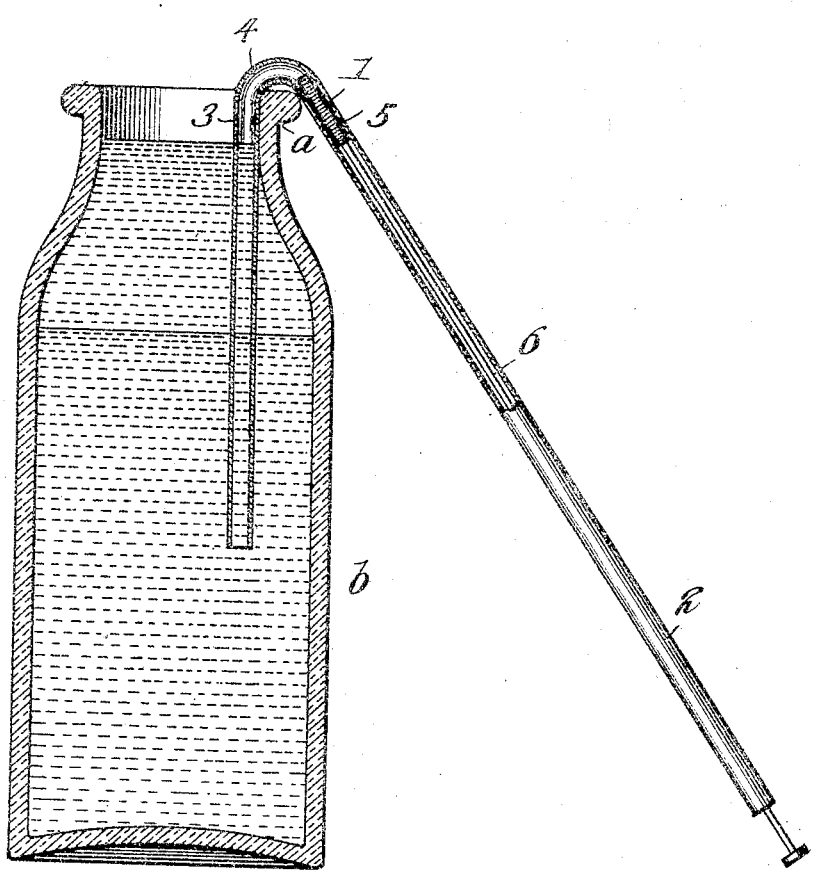
Witnesses
Frank B. Hoffman
J. W. Garner
Inventor
William Lloyd Richards
By Victor J. Evans
Attorney

UNITED STATES PATENT OFFICE.

WILLIAM LLOYD RICHARDS, OF WILKES-BARRE, PENNSYLVANIA.

SIPHON-PUMP.

No. 919,079.  Specification of Letters Patent.  Patented April 20, 1909.

Application filed December 18, 1908. Serial No. 468,214.

*To all whom it may concern:*

Be it known that I, WILLIAM LLOYD RICHARDS, a citizen of the United States, residing at Wilkes-Barre, in the county of Luzerne and State of Pennsylvania, have invented new and useful Improvements in Siphon-Pumps, of which the following is a specification.

This invention is an improved siphon pump especially adapted for use in separating cream from milk in milk bottles for infant feeding, but also adapted for use for decanting lime water, broths, for removing water from gold-fish bowls preparatory to replacing the fresh water and also for use in pharmaceutical and chemical works.

The object of my invention is to provide an improved siphon which may be started without the necessity of creating a suction with the mouth, a further object being to effect such improvements in the construction of the siphon as to enable the same to be readily cleansed, a further object being to effect such improvements in the construction of the siphon as to enable the same to be readily placed in and adapted for operation in connection with a vessel such as an ordinary milk bottle or the like.

The accompanying drawing is partly an elevation and partly a sectional view of a siphon pump constructed in accordance with my invention showing the use in separating the milk from the cream in an ordinary milk bottle.

In accordance with my invention the siphon 1, which in practice is preferably made of glass, but which may be made of any other suitable material, has its longer arm 2 disposed at an angle to its shorter arm 3. In practice, the longer arm is usually slightly more than twice the length of the shorter arm, but this may be varied within the scope of my invention and I do not desire to limit myself in this particular. The longer arm is connected to the shorter arm, in the angle between them, by the neck or connecting portion 4 which is substantially semi-circular and the least diameter of which about corresponds with the thickness of one side of the mouth *a* of a vessel *b*, such as an ordinary milk bottle or the like, so that the said bend, connecting portion or neck of the siphon is adapted to fit on one side of the mouth of the vessel so as to support the siphon with its shorter arm in substantially a vertical position and extending downwardly in the vessel to a suitable depth, according to the length of the shorter arm, and with its longer arm extending downwardly and outwardly from one side of the vessel and terminating at a point below the plane of the lower end of the shorter arm.

In practice where the siphon is designed for special use and in connection with a particular type of vessels, as for instance where the siphon is for use in connection with a milk bottle for separating the cream from the milk by drawing off the cream from above the milk, the shorter arm of the siphon is of a determinate length with reference to the depth of the cream as illustrated in the drawing, that is to say, said shorter arm is of such length as to extend to within a sufficient distance from the top of the vessel to cause all or practically all of the cream to be drawn from the vessel above the milk and leave the milk remaining in the vessel after the cream has been thus drawn.

In order to start the siphon in operation, I provide the same with a plunger 5 for operation in the longer arm of the siphon. This plunger is extremely flexible and in practice is made of some extremely flexible material such as rubber to adapt the plunger to bend and conform to the shape of the neck portion of the siphon and the said plunger is also elastic so as to cause it to fit snugly in the bore of the siphon. The plunger is operated by a rod 6 to the inner end of which it is attached, the said rod being rigid and in practice being made of suitable wire.

Before using the siphon, the plunger is pushed upwardly in the longer arm. The siphon having been then appropriately placed in the vessel, as shown in the drawing, so that the shorter arm thereof becomes submerged to the required extent, the plunger is drawn out of the end and from the longer arm of the siphon so as to exhaust the air therefrom and start a flow of the liquid or contents of the vessel through the siphon and from the longer arm thereof, as will be readily understood. The plunger is not only useful in starting the siphon in operation, but is also useful as a stopper to cut off the flow of liquid from the siphon when desired and owing to the flexible nature of the plunger, the plunger is also extremely useful for cleansing or assisting in the cleansing of the siphon, as it may be drawn from end to end thereof.

What is claimed is:—

A siphon having its longer arm at an angle to its shorter arm and provided with a curved neck in the angle between and connecting said arms, said siphon being further provided with a flexible plunger to operate in the bore thereof and a rigid operating rod for said plunger.

In testimony whereof I affix my signature in presence of two witnesses.

WILLIAM LLOYD RICHARDS.

Witnesses:
 SARAH LIPPINCOTT,
 BLANCHE RICHARDS.